UNITED STATES PATENT OFFICE.

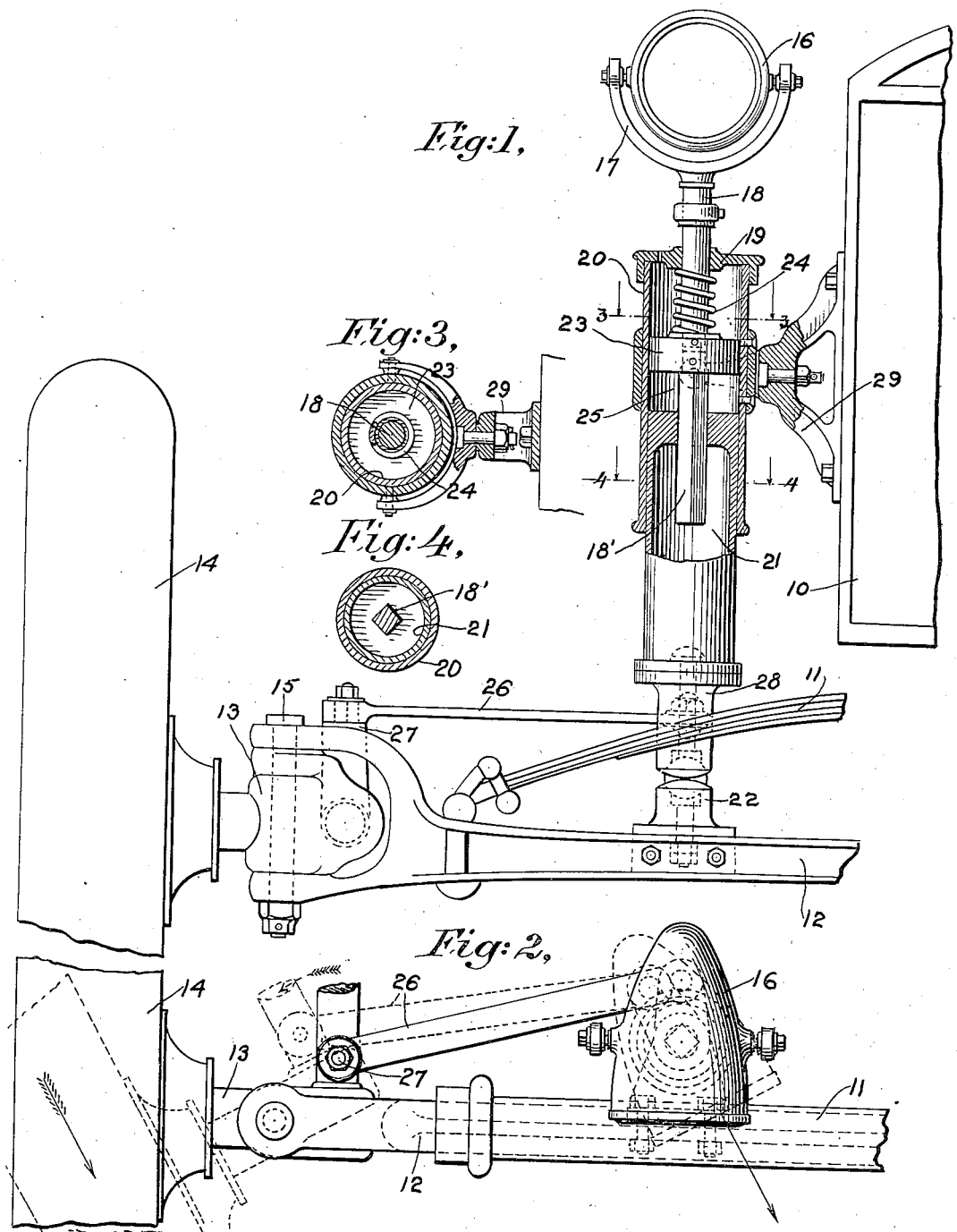

GEORGE W. J. CRABB, OF NEWARK, NEW JERSEY.

DIRIGIBLE HEADLIGHT.

1,318,973.     Specification of Letters Patent.     Patented Oct. 14, 1919.

Application filed March 25, 1919. Serial No. 284,998.

*To all whom it may concern:*

Be it known that I, GEORGE W. J. CRABB, a citizen of the United States, and a resident of Newark, in the county of Essex and State of New Jersey, have invented a new and Improved Dirigible Headlight, of which the following is a full, clear, and exact description.

This invention relates to headlights for automobiles or other vehicles adapted to travel along public highways or the like.

One of the objects of the invention is to provide means for steering a headlight for automobiles or like vehicles in accordance with the steering of the wheels of the vehicle so as to cause the light to be directed substantially in the direction in which the vehicle is to be driven. It is well known that in the driving of automobiles at night along country roads where there are many curves and obstructions to be avoided, the headlights ordinarily fail to illuminate the roadway at those places where the light is most necessary, simply because the headlights are ordinarily fixed with respect to the body of the vehicle which does not respond immediately to the steering of the front wheels.

In my improvement I provide suitable supporting means for a headlight or as many headlights as may be employed, the same to be immediately and directly automatically responsive to the lateral turning of the steering knuckles of the vehicle. The invention has for its main object, therefore, the provision of practical means whereby the headlights will be automatically steered to correspond with the steering of the vehicle.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a front elevation of portions of an automobile equipped with my improvement, parts being in section.

Fig. 2 is a plan view of the same with dotted lines indicating the changed position of the relatively movable parts; and Figs. 3 and 4 are horizontal sections on the corresponding lines of Fig. 1.

Referring now more specifically to the drawings I show a vehicle body 10 supported in any suitable manner as upon springs 11 above a front axle 12 having any suitable or well known steering knuckles 13 upon which the front wheels 14 are journaled. The steering knuckles are or may be conventional with respect to their vertical axes 15 and the means for controlling them, and hence the details of such features are not illustrated.

A headlight 16 of any approved type is mounted in a yoke 17 carried at the upper end of a shank 18 having a rounded portion movable in any direction in a cap 19 fixed to the upper end of a sleeve 20. The lower end of the shank at 18' is polygonal and is fitted for longitudinal sliding movement in the upper end of a hollow shaft 21 suitably supported as by means of a universal joint 22 upon the front axle. The sleeve 20 and hollow shaft 21 are telescopically connected so that the up and down vibrations of the body with respect to the axle are directly provided for without obstruction or resistance. The universal joint connections at 22 provide also for the lateral swaying of the body with respect to the axle and wheels.

23 indicates a plunger or piston within the sleeve 20 and connected to the shank 18 between the piston 23 and the cap 19 is a cushion in the form of a spring 24, while between the piston and the upper end of the shank 21 is a space providing for an air cushion at 25. It will thus be seen that the headlight will be resiliently supported with respect to the vehicle body and axle and will be free to turn around a vertical axis by virtue of a link 26 leading between the steering knuckle at 27 and the bracket 28 at the lower end of the shaft 21. Any suitable swiveled bracket or gimbal joint connection 29 may be provided to support the sleeve 20 upon the vehicle body or other convenient support.

The operation of the device will be understood from the foregoing specific description as follows: With the steering knuckles in normal position and with the front wheels in alinement with the rear wheels the link or links 26 will hold the lamp or lamps so that the focal axes thereof will be projected directly forward illuminating the roadway straight ahead. When, however, the vehicle is steered in either direction from the straight-away position the headlights will be caused to be steered in the same direction automatically by means of the connections aforesaid, so that if a curve is to be taken by the vehicle the light from the lamps will illuminate the curve or any objects along the way. Obviously the connections illustrated may be extended to both sides of the vehicle for any number of lamps or the connections may be duplicated on opposite sides of the body.

I claim:

1. In a dirigible headlight construction, the combination with a vehicle including a body, an axle and a steering knuckle, of two telescopic members, means connecting one of said members to the body, universal joint connections between the other of the telescopic members and the axle, a lamp, a support for the lamp including a vertical shank having angular connection with the telescopic member connected to the axle, and pivoted link connections between the steering knuckle and the member having angular connection with the lamp shank.

2. The combination with a vehicle body, an axle and a steering knuckle carried by the axle, of a sleeve, a swivel supporting the sleeve upon the body, a shaft telescopically connected with the sleeve, universal joint connections between the shaft and the axle, pivoted link connections between the steering knuckle and the shaft whereby the shaft will be rotated around a vertical axis simultaneously with the steering of the vehicle, a lamp, a support for the lamp including a shank projecting downward through the sleeve and having angular connection with the shaft whereby the lamp will be rotated with the shaft or held stationary thereby, and cushioning means for the lamp shank within the sleeve, substantially as set forth.

GEORGE W. J. CRABB.